United States Statutory Invention Registration [19]

[11] Reg. Number: H776

Cole [43] Published: May 1, 1990

[54] AERODYNAMIC FLAIL FOR A SPINNING PROJECTILE

[75] Inventor: James K. Cole, Albuquerque, N. Mex.

[73] Assignee: The United States of America as represented by the United States Department of Energy, Washington, D.C.

[21] Appl. No.: 306,359

[22] Filed: Feb. 6, 1989

[51] Int. Cl.[5] ..... F42B 8/00; F42B 13/20; F42B 15/10

[52] U.S. Cl. ..... 102/498; 102/387; 102/388; 102/529

[56] References Cited

PUBLICATIONS

W. Pepper et al., "Parachute System To Recover Spinning (250 RPS 155-mm Shell Subjected To 20,000 g's Launch Conditions", Sandia Report SC-R-68-1806, Sep. 1968 (also No. 68-937, AIAA 2nd Aerodynamic Deceleration Systems Conference, El Centro, CA, Sep. 23-25, 1968.

*Primary Examiner*—David H. Brown
*Attorney, Agent, or Firm*—Anne D. Daniel; James H. Chafin; Judson R. Hightower

[57] ABSTRACT

A flail is provided which reduces the spin of a projectile in a recovery system which includes a parachute, a cable connected to the parachute, a swivel, and means for connecting the swivel to the projectile. The flail includes a plurality of flexible filaments and a rotor for attaching the filaments to the front end of the projectile. The rotor is located radially with respect to the spinning axis of the projectile. In one embodiment, the projectile includes a first nose cone section housing a deployable spin damping assembly; a second nose cone section, housing a deployable parachute assembly; a shell section, supporting the first and second nose cone sections during flight of the projectile; a mechanism for releasing the first nose cone section from the second cone section; and a mechanism for releasing the second nose cone section from the shell section. In operation of this embodiment, the deployable spin damping assembly deploys during flight of the projectile when the mechanism for releasing the first nose cone section from the second nose cone section are actuated. Then, upon actuation of the mechanism for releasing the second nose cone section from the shell section, two things happen: the spin damping assembly separates from the projectile; and the deployable parachute assembly is deployed.

13 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

AERODYNAMIC FLAIL FOR A SPINNING PROJECTILE

The U.S. Government has rights in this invention pursuant to Contract No. DE-AC04-76DP00789 between the U.S. Department of Energy and AT&T Technologies Inc.

BACKGROUND OF THE INVENTION

The present invention relates to the field of design and testing of artillery shells, and more particularly to the recovery of artillery shells that have been fire from guns.

In the art of design and testing of artillery shells, and in stockpile evaluation, especially for atomic artillery shells, numerous test firings are conducted. In many of the test firings, it is necessary to recover the shell intact to evaluate the performance of its components. In flight, the shells are spin stabilized and can be revolving at 10,000 to 20,000 rpm. To permit recovery, the shells are fired from guns set at high elevation angles, about 85–88 degrees above the horizontal. On such high trajectories, the shell falls base first after passing through the apogee of its trajectory. A parachute recovery system [Pepper, W. B. and Fefferhoff, R. D., "Parachute System to Recover Spinning (250 RPS) 155-mm Shell Subjected to 20,000 g's Launch Conditions," Sandia Report SC-R-68-1806, September 1968 AIAA Paper No. 68-937 of American Institute of Aeronautics and Astronautics] is deployed from the nose sometime after the apogee is passed. While the shell is suspended on the parachute and still spinning at a high rate, its aerodynamic and gyrodynamic characteristics can cause it to nutate from a base down to a nose down attitude.

Recovery system failure can result from a number of causes. For example, the parachute and suspension lines may become tangled during deployment at the high spin rates. Or, the swivel for the suspension line may fail. If the parachute does deploy properly and the rapidly spinning shell nutates to a sufficient angle, the shell nose can rub on the support lines to the parachute. The suspension lines may be worn into two by the shell's rubbing and also cause a recovery system failure.

When the recovery system fails, the shell can free fall to the ground and be severely damaged. Although the present recovery system provides better than an 85% success rate, it would be desirable to improve recovery system reliability. More specifically, the cost of each test for a shell is presently between $100,000 and $250,000. Even a 15% failure rate leads to much unwanted cost.

In the past, attempts have been made to despin test shells. In one previous attempt, the shell recovery system requires that the shell rotate into a nose down attitude so the shell will rub against the parachute suspension cable to produce a despin torque. As mentioned above, such a system may directly lead to failure of shell recovery.

In another past attempt to despin test shells, several rings were mounted in the shell's nose concentric with its longitudinal (spinning) axis. The rings were free to move both radially and longitudinally and to revolve relative to the shell. The presence of the rings was designed to cause the shell to become unstable after gun launch and to change the spin about the longitudinal axis into a large coning motion which would produce spin deceleration through aerodynamic damping. A severe problem with the ring system was the occurrence of severe vibrations in the shell that resulted in damage and partial destruction of shell components. Consequently, the ring system was abandoned. It would be desirable, therefore, to provide a shell recovery system which did not result in destruction of shell components.

SUMMARY OF THE INVENTION

Accordingly, it is a primary object of the present invention to provide means for improving the recovery rate of test shells fired from guns with parachute recovery system.

Another object of the invention is to provide an improved test recovery system in which rubbing of parachute suspension lines or other components by a spinning test shell is reduced or prevented.

Another object is to provide an improved test recovery system in which a spinning test shell will not nutate from a base down to a nose down attitude.

To achieve the foregoing and other objects, and in accordance with the purposes of the present invention as described herein, an improved recovery system for a test projectile is provided. The recovery system is for a spinning test projectile and includes a parachute, a cable connected to the parachute, a swivel, and means for connecting the swivel to the projectile. The improved recovery system is characterized in providing means, herein referred to as a flail, for reducing the spin rate of the projectile.

More specifically, the flail includes a plurality of flexible filaments and means for attaching the filaments to the projectile near the front end of the projectile. The filaments are attached to the projectile radially with respect to the spinning axis of the projectile. More specifically, a rotor is employed to support the filaments, and the rotor is disposed radially with respect to the spinning axis of the projectile. In use, the flexible filaments may be deployed before the parachute is deployed in order to reduce shell spinning before the parachute is deployed. Alternatively, the flexible filaments may be deployed at the same time or after the parachute is deployed.

The centrifugal acceleration of the spinning shell causes the filaments of the flail to swing out relative to the rotor. As the filaments are whipped through the air by the shell's spin, they create an aerodynamic drag torque about the spin axis of the shell, and the drag serves to decrease the rate of spin. The reduction in the rate of spin prevents the spinning shell from nutating to large angles. Since large angle nutation of the shell is prevented, unwanted side effects that lead to test failure described above are also prevented.

The selection of the filament material is important to the successful operation of the flail of the invention. The ratio defined by the filament tensile strength divided by filament density significantly affects flail performance. The larger the ratio, the longer the filaments that can be employed, and the more despin damping each can produce. The centrifugal accelerations that result from a projectile's high spin rates may be large enough to cause filaments that have a relatively small ratio to break when only a short length filament is deployed. Therefore, the length of the filaments is selected so that the filaments do not break during projectile spinning. More specifically, relatively long filaments may be employed made from material of relatively large tensile strength. Also, relatively long filaments may be employed made from material having a relatively large ratio defined by filament tensile strength divided by filament density.

Another ratio that is important is the ratio defined by the filament density divided by the density of the fluid medium in which the flail operates, in this case, air. If this second ratio were small, the filament would be deflected significantly by the air and would not be as efficient in despinning the projectiles. Therefore the filaments are made from material having a relatively large ratio defined by filament density divided by air density. In this way, the filaments are not significantly deflected by the air, and the filaments are efficient in producing despinning of the projectile. Suitable filaments are aircraft cable and Kevlar cable.

The number of filaments that are used in the flail can be varied substantially. A relatively small number of filaments, e.g. 10–50, that are arranged around and along the rotor which interact with relatively undisturbed air will be more efficient than thousands of filaments which are swept around in the wakes of other filaments.

In accordance with another aspect of the invention, a projectile is provided which includes a shell portion, a deployable parachute assembly, and a deployable spin damping assembly. The parachute assembly and the spin damping assembly are carried by the shell portion and are deployed during flight of the projectile.

More specifically, one embodiment of the projectile of the invention may include a first nose cone section housing a deployable spin damping assembly; a second nose cone section, connected to the first nose cone section, housing a deployable parachute assembly; a shell section, connected to the second nose cone section, supporting the first and second nose cone sections during flight of the projectile; means for releasing the first nose cone section from the second cone section; and means for releasing the second nose cone section from the shell section. In operation of this embodiment, the deployable spin damping assembly deploys during flight of the projectile when the means for releasing the first nose cone section from the second nose cone section are actuated. Then, upon actuation of the means for releasing the second nose cone section from the shell section, two things happen: the spin damping assembly separates from the shell; and the deployable parachute assembly is deployed.

In accordance with another embodiment of the projectile of the invention, the projectile may include the following elements a single nose cone section which houses both a deployable spin damping assembly and a deployable parachute assembly; means for delaying release of the parachute assembly until after the spin damping assembly is deployed; a shell section, connected to the nose cone section and supporting the nose cone section and the delaying means; and releasing means for releasing the nose cone section from the shell section. In operation of this embodiment, during flight of the projectile, the deployable spin damping assembly first deploys, during which time the means for release of the parachute assembly is delayed. After deployment of the spin damping assembly, the parachute assembly then deploys; and the spin damping assembly and parachute assembly function simultaneously.

The means for releasing the first nose cone, the second nose cone, and single nose cone may include a timer to permit the releases at predetermined times in the shell trajectory.

With respect to the timing of the deployment of the spin damping assembly versus the trajectory of the projectile, the spin damping assembly may be deployed either before the projectile reaches the apogee of its trajectory, at the time the apogee of the trajectory is reached, or after the apogee of the trajectory has been passed.

Additional objects, advantages, and novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION

Figure 1:
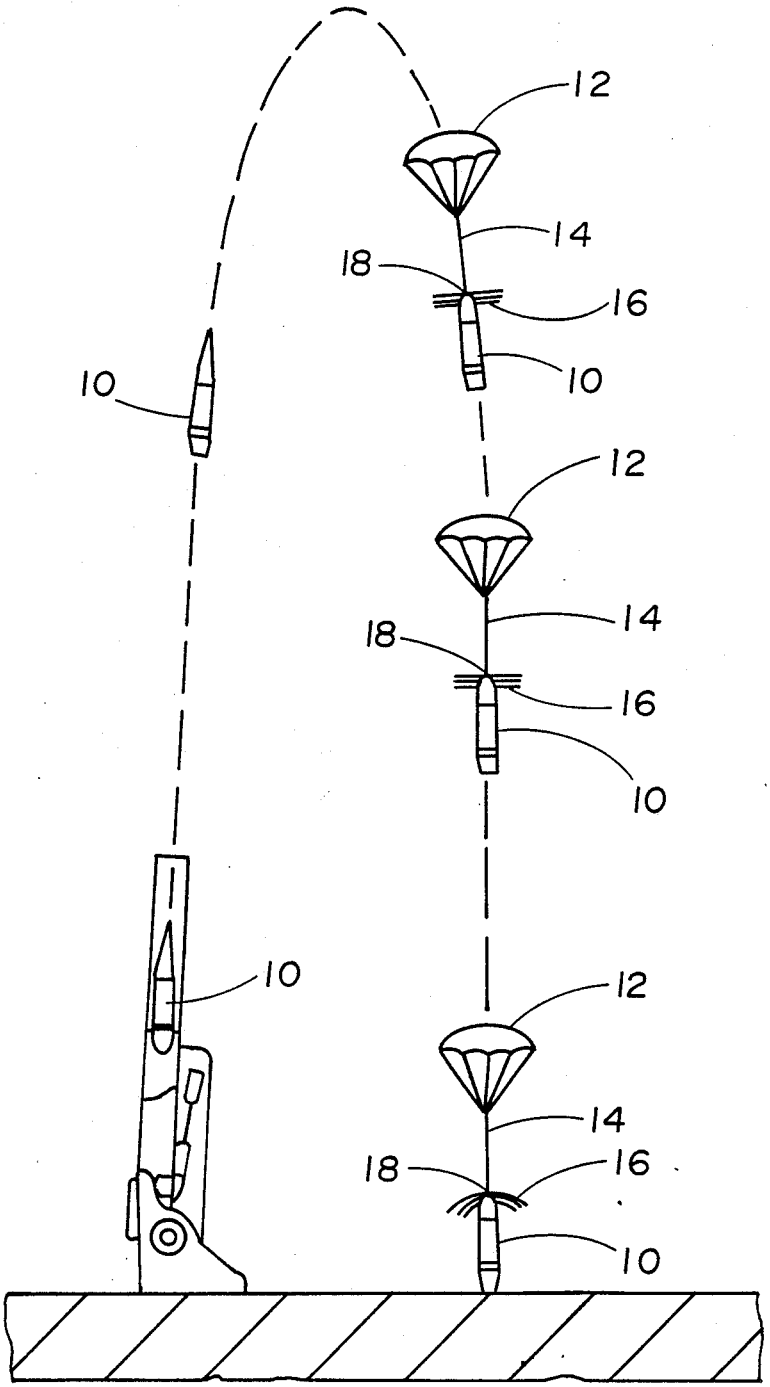
FIG. 1 is a schematic drawing of a parachute recovery system and a shell recovery system of the invention fired from a gun.
Figure 2:
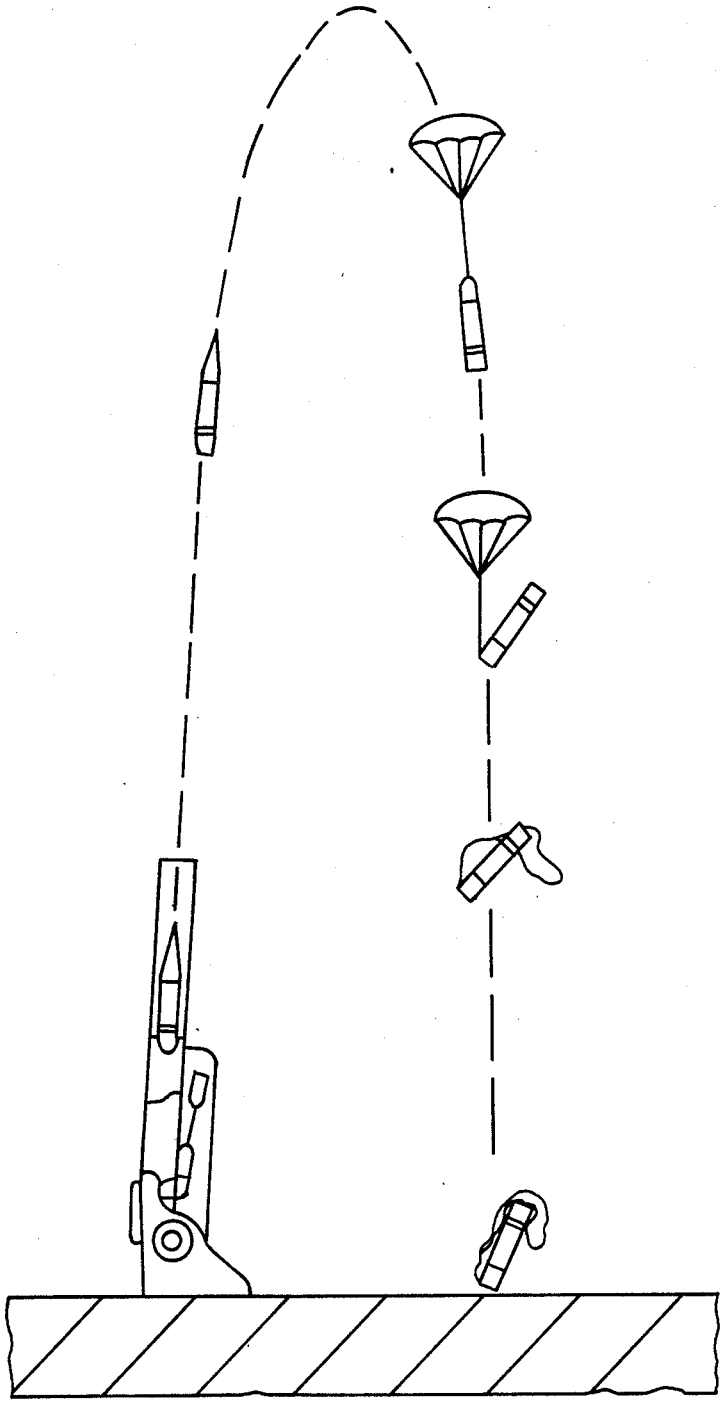
FIG. 2 (PRIOR ART)
FIG. 2 is a schematic drawing of a prior art parachute-based shell recovery system in which the spinning shell nutates.

With reference to FIG. 1, an embodiment of an improved recovery system for a test projectile 10 is provided. The recovery system is for a spinning test projectile and includes a parachute 12, a cable 14 connected to the parachute 12, and a swivel 13 for connecting the cable to the projectile (See FIG. 3). The improved recovery system includes a plurality of wires 16 for reducing the spin rate of the projectile 10. The plurality of wires 16 are, for convenience, referred to as a flail 16.

The wires (or flexible filaments more generally) of the flail 16 are attached to the projectile 10 near the front end 18 of the projectile. The flail filaments 16 are attached to the projectile 10 radially with respect to the spinning axis 20 (See FIG. 3) of the projectile 10.

Figure 3:
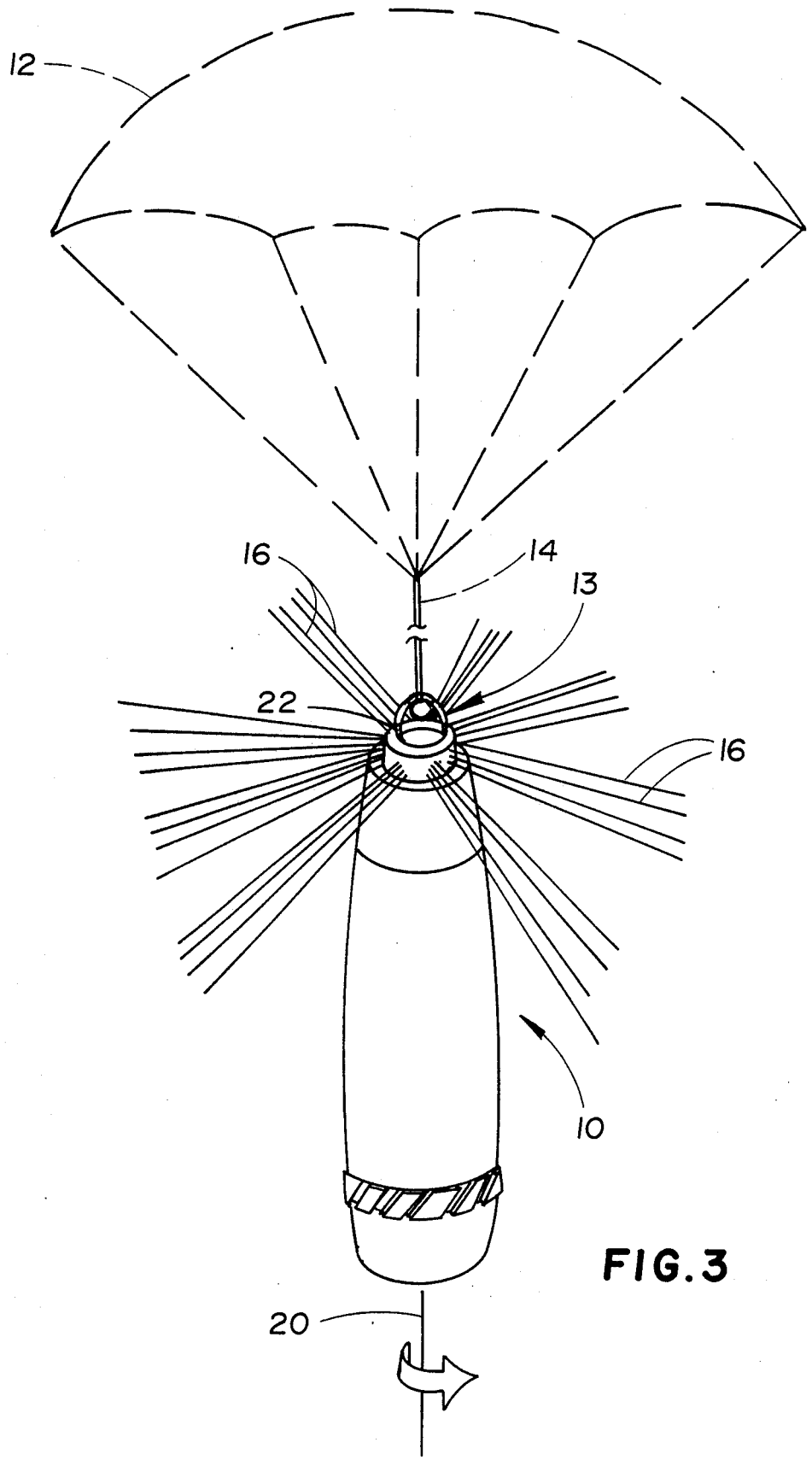
FIG. 3 is a schematic drawing depicting a shell including the flail of despinning filaments of the invention.

Referring to FIG. 3, a rotor 22 is employed to support the filaments 16, and the rotor 22 is disposed radially with respect to the spinning axis 20 of the projectile 10. In use, the flexible filaments 16 may be deployed before the parachute 12 is deployed in order to reduce projectile spinning (also referred to as shell spinning) before parachute 12 deploys.

Alternatively, the flexible filaments 16 may be deployed at the same time or after the parachute 12 is deployed.

The centrifugal acceleration of the spinning projectile causes the filaments 16 of the flail to swing out relative to the rotor 22. As the filaments 16 are whipped through the air by the shell's spin, they create an aerodynamic drag torque about the spin axis 20 of the shell, and the drag serves to decrease the rate of spin. The reduction in the rate of spin prevents the spinning shell from nutating to large angles. Since large angle nutation of the shell is prevented, unwanted side effects that lead to test failure described above are prevented.

The embodiment shown in FIG. 3, may be interpreted in either of two ways, either as the embodiment in FIG. 4 described below before the parachute is deployed (in such a case the parachute 12 and cable 14 would not be deployed in FIG. 3) or as the embodiment in FIG. 5 after parachute deployment (in such a case the parachute and cable would be present in FIG. 3.)

Figure 4:
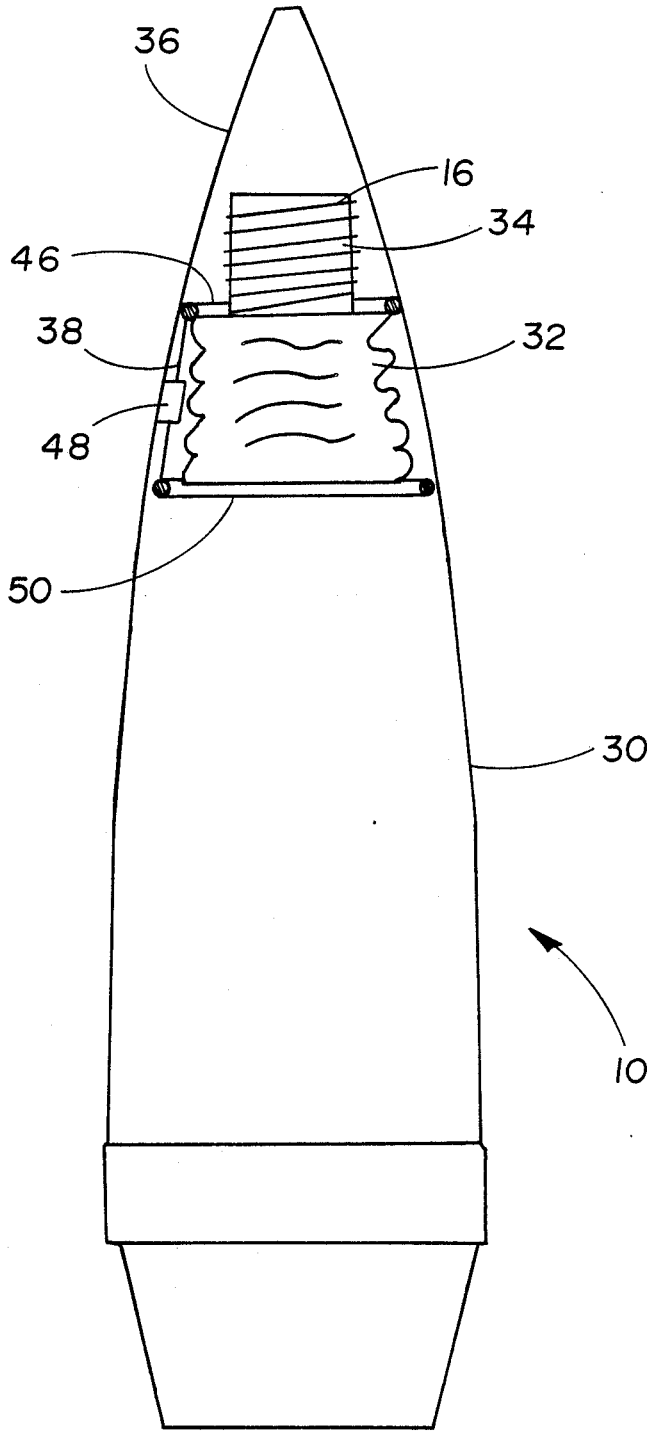
FIG. 4 depicts an embodiment of the flail in which the flail is deployed from the shell, performs its despinning function, and is released from the shell prior to parachute deployment.
Figure 5:
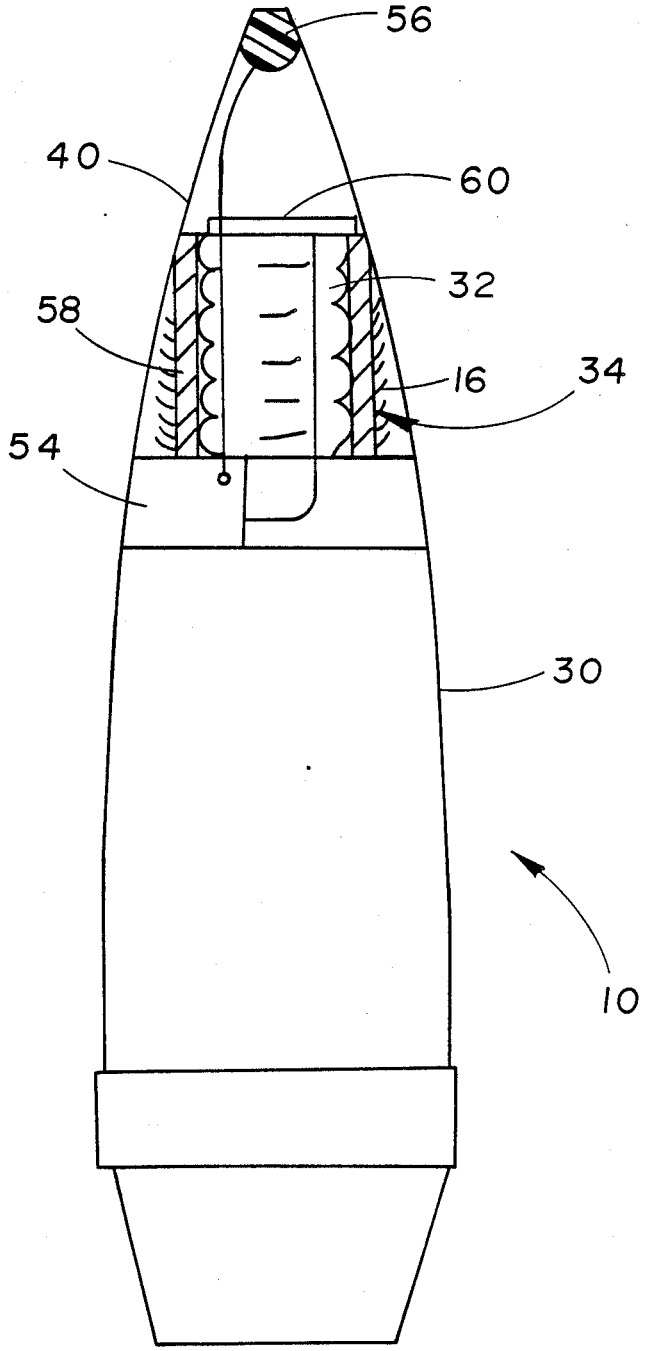
FIG. 5 depicts an embodiment of the flail in which the flail remains deployed after parachute employment.

Referring to FIGS. 4 and 5, a projectile 10 is provided which includes a shell portion 30, a deployable parachute assembly 32, and a deployable spin damping assembly 34. The parachute assembly 32 and the spin damping assembly 34 are carried by the shell portion 30 and are deployed during flight of the projectile 10.

More specifically, in the embodiment shown in FIG. 4, a first nose cone section 36 houses a deployable spin damping assembly 34. A second nose cone section 38 is connected to the first nose cone section 36 and houses a deployable parachute assembly 32. A shell section 30 is connected to the second nose cone section 38 and supports the first and second nose cone sections during flight of the projectile.

Means for releasing the first nose cone section 36 from the second cone section 38 are provided; and means are provided for releasing the second nose cone section 38 from the shell section 30. In operation of the embodiment in FIG. 4, the deployable spin damping assembly 34 deploys during flight of the projectile 10 when the means for releasing the first nose cone section 36 from the second nose cone section 38 are actuated. After the spin damping assembly has performed its function, the means for releasing the second nose cone section 38 from the shell section 30 are activated, and two things happen: the spin damping assembly 34 separates from the shell 30; and the deployable parachute assembly 32 is deployed. A timer 48 may be used to detonate a first explosive charge 46 to break apart first nose cone 36 and thereby release the spin damping assembly 34 to permit the flail 16 to deploy. After a predetermined time period, the timer 48 is then used to detonate a second explosive charge 50 to break apart the second nose cone 38 and both to separate the spin damping assembly 34 from the shell and to deploy the parachute assembly 32.

Referring to the embodiment shown in FIG. 5, the projectile 10 may include a single nose cone section 40 which houses both a deployable spin damping assembly 34 and a deployable parachute assembly 32. Means are provided for delaying release of the parachute assembly 32 until after the spin damping assembly 34 is deployed. A shell section 30 is connected to the single nose cone section 40 and supports the nose cone section 40 and the delaying means. In operation of the embodiment in FIG. 5, during flight of the projectile 10, the nose cone 40 is separated from the shell section 30 by means of timer 54 and explosive charge 56 actuated by the timer 54. Once the nose cone 40 is separated from the shell 30, the flail filaments 16 of the deployable spin damping assembly 34 are deployed. The parachute assembly 32 is packed in the hollow space of rotor 58 and is prevented from being deployed by cover 60. After the flail 16 has been exerting its despin damping for a predetermined time, the timer 54 causes the cover 60 on the rotor 58 to be released, and the parachute assembly 32 is then deployed. In this embodiment, the flail 16 is retained by the shell 30 during and after parachute 12 deployment and continues to exert its despinning torque after parachute deployment.

The specific details of the parachute assembly are well known in the art and are described in detail in the above-mentioned publication of Pepper and Fellerhoff. In addition, the Pepper and Fellerhoff publication describes in detail the nose cones, the housing for the explosive train, and the timer and deployment signals.

More specifically, with respect to a timer, a timer may be a modified clockworks from a standard M500A1 artillery fuse, unlocked by setback accelerations and driven by centrifugal force. At a preset time, as determined from trajectory calculations, a firing pin is released providing the necessary energy to initiate the explosive train and release the assembly activated by the timer.

Suitable filaments 16 may be made from steel aircraft cable, may be of a length in the range of $1-1\frac{1}{4}$ feet, may have a tensile strength in the range of 200,000 psi, and may have a specific weight in the range of 470–490 $lb/ft^3$.

The foregoing description of the invention has been presented for purposes of illustration and description. It is not intended to be exhaustive or to limit the invention to the precise form disclosed. Obvious modifications or variations are possible in light of the above teachings. The embodiment was chosen and described in order to best illustrated the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. In a recovery system for a projectile spinning around a longitudinal axis, the projectile having a nose cone, the recovery system, including a parachute, a cable connected to the parachute, a swivel and means for connecting the swivel to the projectile, an apparatus for reducing projectile spin comprising:

means for releasing the nose cone, a plurality of flexible filaments, means for attaching said filaments to the projectile near the front end of the projectile, the centrifugal acceleration of the spinning projectile causing said filaments to move through the air and create aerodynamic drag about the spin axis of the projectile after the nose cone has been released, whereby the drag serves to decrease the rate of spin of the projectile.

2. The apparatus described in claim 1 wherein the length of said filaments is selected so that said filaments do not break during projectile spinning.

3. The apparatus described in claim 1 wherein the tensile strength of said filaments is selected so that said filaments do not break during projectile spinning.

4. The apparatus described in claim 1 wherein the density of said filaments is selected so that said filaments do not break during projectile spinning.

5. The apparatus described in claim 1 wherein said filaments are attached to said projectile radially with respect to the spinning axis of the projectile.

6. The apparatus described in claim 1 wherein said means for attaching said filaments to the projectile includes a rotor which rotates around the spinning axis of the projectile.

7. A projectile, including:

a deployable parachute assembly including a parachute, a deployable spin damping assembly including spin damping filaments, said parachute assembly and said spin damping assembly being carried by said shell portion and deploying during flight of the projectile, means for deploying said parachute, and means for deploying said spin damping filaments.

8. A projectile, including:

a first nose cone section housing a deployable spin damping assembly including spin damping filaments, a second nose cone section, connected to said first nose cone section, housing a deployable parachute assembly including a parachute, a shell section, connected to said second nose cone section, supporting said first and second nose cone sections during flight of the projectile, first releasing means for releasing said first nose cone section from said second cone section, second releasing means for releasing said second nose cone section from said shell section, wherein said spin damping filaments deploy during flight of the projectile and separate from the projectile prior to deployment of said parachute upon actuation by said first releasing means, wherein said parachute deploys during flight of the projectile and is released from said second nose cone section upon actuation by said second releasing means.

9. The projectile described in claim 8 wherein said second releasing means includes a timer for timed release of said second nose cone section from said shell section.

10. The projectile described in claim 8 wherein said first releasing means includes a timer for timed release of said first hose cone section from said second nose cone section.

11. A projectile, including:

a nose cone section housing a deployable spin damping assembly including spin damping filaments and a deployable parachute assembly including a parachute, means for delaying deployment of said parachute until after said spin damping filaments are deployed, a shell section, connected to said nose cone section and supporting said nose cone section and said delaying means, releasing means for releasing said nose cone section from said shell section, wherein, during flight of the projectile, said deployable spin damping filaments first deploy, said means for delaying release of said parachute are delayed, and said parachute then deploys.

12. The projectile described in claim 11 wherein said releasing means include a timer for timed release of said nose cone section from said shell section.

13. In a method for recovering a spinning projectile fired into the air, including the deployment of a parachute during descent of the projectile, the method including the step of:

deploying a plurality of flexible filaments from the spinning projectile during flight of the projectile along its trajectory, whereby the centrifugal acceleration of the spinning projectile causes the filaments to move through the air and create aerodynamic drag about the spin axis of the projectile, whereby the drag serves to decrease the rate of spin of the projectile.

* * * * *